(12) United States Patent
Lee et al.

(10) Patent No.: US 7,148,881 B2
(45) Date of Patent: Dec. 12, 2006

(54) APPARATUS AND METHOD FOR INCREASING ACCURACY OF TOUCH SENSOR

(75) Inventors: Carry Lee, Chung-Li (TW); Peggy Kuo, Chung-Li (TW); Vicky Tseng, Chung-Li (TW)

(73) Assignee: Eturobtouch Technology, Inc., Chung-Li (TW)

( * ) Notice: Subject to any disclaimer, the term of this patent is extended or adjusted under 35 U.S.C. 154(b) by 0 days.

(21) Appl. No.: 10/200,122

(22) Filed: Jul. 23, 2002

(65) Prior Publication Data

US 2003/0132920 A1 Jul. 17, 2003

(30) Foreign Application Priority Data

Jan. 11, 2002 (TW) ................................ 91100320 A

(51) Int. Cl.
*G09G 5/00* (2006.01)
(52) U.S. Cl. .................... 345/173; 345/174; 178/18.05
(58) Field of Classification Search ................ 345/173, 345/174; 178/18.01, 18.03, 18.05
See application file for complete search history.

(56) References Cited

U.S. PATENT DOCUMENTS

| | | | | |
|---|---|---|---|---|
| 4,293,734 A | * | 10/1981 | Pepper, Jr. ............... | 178/18.01 |
| 4,661,655 A | * | 4/1987 | Gibson et al. ........... | 178/18.05 |
| 4,797,514 A | * | 1/1989 | Talmage et al. ......... | 178/18.05 |
| 4,822,957 A | * | 4/1989 | Talmage et al. ......... | 178/18.05 |
| 5,045,644 A | * | 9/1991 | Dunthorn ................. | 178/18.05 |
| 5,736,688 A | * | 4/1998 | Barrett et al. ............ | 178/18.05 |
| 6,163,313 A | * | 12/2000 | Aroyan et al. ............. | 345/173 |
| 6,593,916 B1 | * | 7/2003 | Aroyan ....................... | 345/173 |
| 6,781,579 B1 | * | 8/2004 | Huang et al. ............... | 345/173 |

* cited by examiner

*Primary Examiner*—Regina Liang
(74) *Attorney, Agent, or Firm*—Birch, Stewart, Kolasch and Birch, LLP

(57) ABSTRACT

An apparatus for increasing the sensing accuracy of a touch sensor comprises a transparent or translucent substrate; a conductive film coated on the upper surface of the substrate; a plurality of resistor elements printed in at least one or more than one row, wherein adjacent ends of individual resistor elements are joined at the junctions at or near the four corners by wires, and wherein first gaps are formed between each independent row of resistor elements; a plurality of insulator elements formed discontinuously formed by removing a part of the conductive film near the inner side of the resistor elements on the surface thereof, the removed portions thus forming the insulator elements which are arranged; in at least more than one row, on the inner side of the resistor elements; and a plurality of second gaps formed between each row of the plurality of insulator elements.

6 Claims, 7 Drawing Sheets

APPARATUS AND METHOD FOR INCREASING ACCURACY OF TOUCH SENSOR

BACKGROUND OF THE INVENTION

1. Field of the Invention

The present invention relates to an apparatus and method for increasing the sensing accuracy of touch sensor, in particular for providing greater accuracy in the signal coordinates of the equipotential lines in the x-axis and y-axis direction produced on the (surface of the) sensor when the touch screen/board is touched at a specific location with a finger or other object or tool.

2. Description of the Related Art

With reference FIG. 7, the conventional touch sensor shown therein has a layer of conductive film B (ITO layer) coated on the surface of a transparent or translucent substrate A; a conductive material C (such as silver paste or frit) printed in a generally rectangular shape on the perimeter of the conductive film B, forming a linear pattern, and four wires W1, W2, W3 and W4 connected to the four corners C1~C4 of the conductive material C. By applying a suitable positive voltage on two corners C2,C4 and applying 0V voltage on the other two corners C1,C3, an electrical field is formed on the conductive film B. The degree of impedance (or conductivity) of the conductive material C depends on the uniformity of the electrical field on the surface of the conductive film B. For instance, if the conductive material C is highly conductive, then all electrical current will flow through the conductive material C and only a small portion will flow toward the middle surface area of the conductive film B (ITO layer), so that the contacted point on the conductive film B will be difficult to sense due to overly weak voltage. As a result, the equipotential lines S in the x-axis and y-axis direction defined by the electrical field on conductive film B surface exhibit a curve or bow shape. These curved equipotential lines S are distributed on the surface contact area of the conductive film B. When that area is touched, the voltage signals in the x,y axis direction generated are inaccurate. Thus, the cursor and the contacted point appearing on the display become positionally incorrect.

The general approach to deal with this problem was to straighten the bow of equipotential lines S in the x-axis and y-axis direction. In practice, however, the number of isolator device must be increased to counteract the curved shape of the equipotential lines S, and this considerably increases the cost. Accordingly, the present inventor tried another approach which is to replace the conductive material C with a material having low conductivity but higher impedance. Such a design, however, has some disadvantages. The voltage in the mid-region between each adjacent corner (C3,C1), or the mid-region of corners C1~C2, or the mid-region of corners C2~C3, or the mid-region of C3~C4, is always higher than the voltage at the end of the four corners C1, C2, C3 and C4. Thus, the equipotential lines of the electrical field are still noted to be non-linear and curved in some certain areas, and the same positional inaccuracy occurs in the coordinate represented by the voltage signal generated upon contact of the surface of the conductive film B at certain location.

To improve upon the above drawback, U.S. Pat. No. 4,661,655 reduces the bow of the equipotential lines generated on the sensor surface by utilizing electrodes 36 which are printed on the perimeter of the conductive film 10 surface in a single row and in a discontinuous and non-overlapping manner to increase the impedance of each row of electrodes. Although increasing the impedance on the electrodes can compensate and somewhat improve part of the bow of the equipotential lines, the condition of the distribution of the bow of the equipotential lines cannot be effectively minimized. Thus, the application of this patent requires reliance on additional hardware and software for correction to achieve the object of linearity.

U.S. Pat. No. 4,797,514 essentially discloses an apparatus in which the surface of a transparent or translucent substrate 14 is printed with a conductive material 16 (i.e. impedance material) in a rectangular frame shape, the conductive material 16 being continuous; and a layer of conductive film (or impedance layer) 18 is printed on the surface of the substrate 14, the conductive material 16 being interposed under the lower surface of the conductive membrane 18, and is primarily characterized in that the inner sides of the four corners in the perimeter of the conductive membrane 18 are etched to form a plurality of insulator regions 26, and between adjacent insulator regions 26 are formed resistor electrode elements 24. As current flows through between the resistor electrode elements 24, a specific voltage gradient will be generated in these plurality of insulator areas. The effective voltage gradient can offset (or compensate) the voltage drop generated by the conductive material 16, and in turn lower the voltage generated by the conductive material 16, and the curved equipotential lines caused thereby are corrected to straight lines.

The drawback in this prior patent resides in that the conductive material 16 is continuous and thus, when the junctions at the corners is input with an appropriate voltage, the ratio of the voltage drop produced between adjacent corners is considerably large. To rely solely on the single-row of insulator region 26 and resistor electrode elements 24 to decrease the voltage is insufficient. In other words, in the four corners of the active area of the sensor, equipotential lines with large curvature will still be produced thus requiring that the active area be separated from the wiring area at a specific distance to avoid the position shift arising in response to the bow-shape equipotential lines.

In light of the foregoing, a method and an apparatus for increasing the sensing accuracy of a touch sensor has been developed.

SUMMARY OF THE INVENTION

Accordingly, a main object of the present invention is to provide a method and an apparatus for increasing the sensing accuracy of a touch-sensor. By means of the resistor elements (or conductive elements) printed discontinuously on the perimeter edges of the conductive film surface, the voltage difference (or voltage gradient) generated by the resistor elements can be preliminarily decreased so as to preliminarily minimize the bow of the equipotential lines produced by each row of the resistor elements. Further, by means of the action of both the plurality of rows of insulator regions distributed in the inner side of the resistor elements and the gaps, the bow-shape equipotential lines that have been preliminarily corrected can be further even more effectively straighten into linear lines.

To achieve the above object, the present invention provides an apparatus for increasing the sensing accuracy of a touch sensor comprising:

a transparent or translucent substrate;

a conductive film very thinly coated on the upper surface of the substrate;

a plurality of resistor elements consisting of conductive material, printed in at least one or more than one row and in a discontinuous manner, on the upper surface of the conductive membrane at the perimeter thereof, wherein adjacent ends of individual resistor elements are joined at the junctions at or near the four corners by wires, and wherein first gaps are formed between each independent row of resistor elements;

a plurality of insulator elements discontinuously formed by removing a part of the conductive film near the inner side of the resistor elements on the surface thereof, the removed portions thus forming the insulator elements which are arranged; in at least more than one row, on the inner side of the resistor elements; and a plurality of second gaps formed between each row of the plurality of insulator elements.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
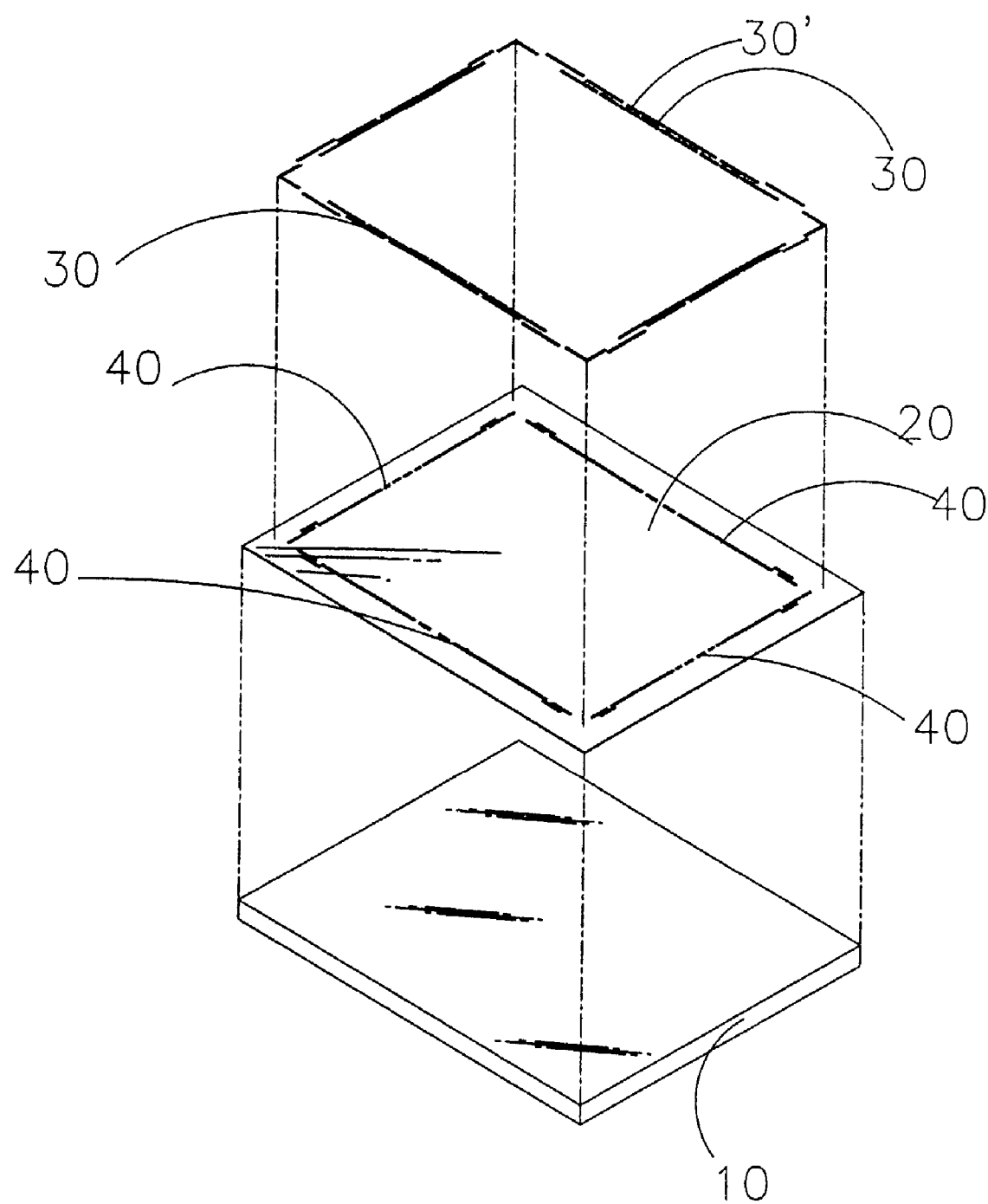
FIG. 1 is a perspective view of the touch sensor apparatus according to the present invention.
Figure 2:
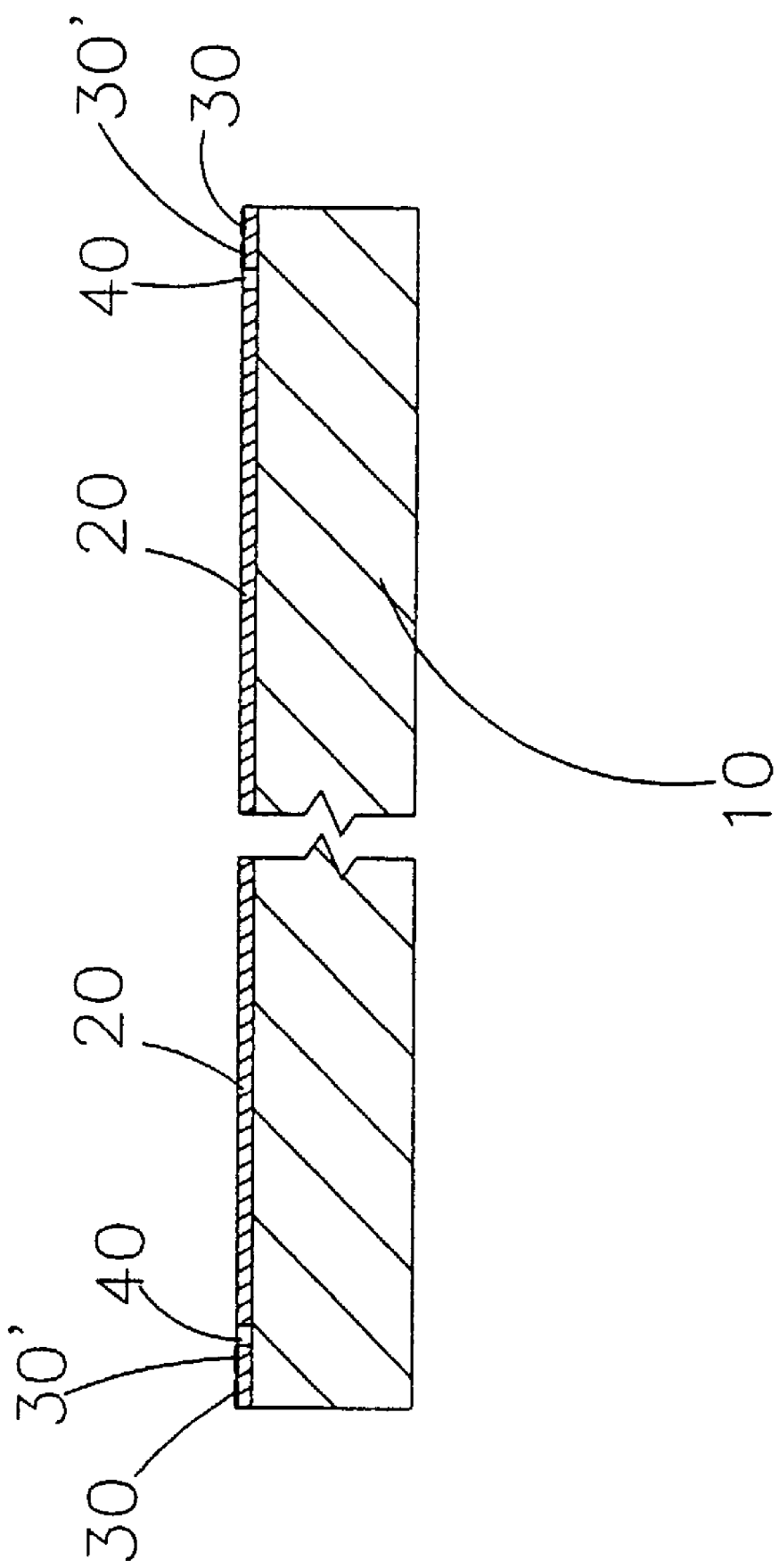
FIG. 2 is a sectional view of the touch sensor apparatus according to the present invention.
Figure 3:
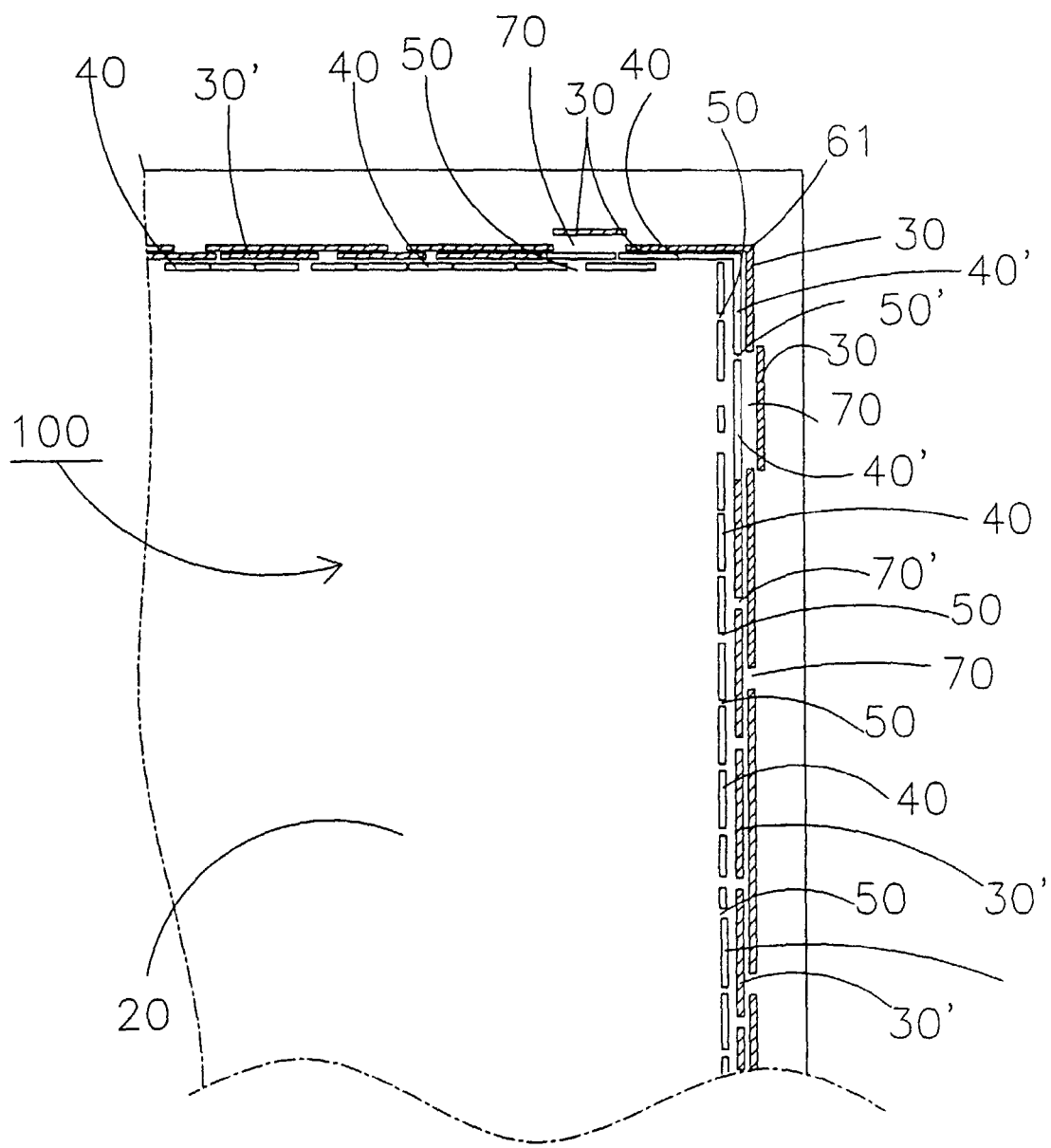
FIG. 3 is a plan view of the touch sensor according to the present invention, showing the distribution pattern of resistor elements and insulator elements along a corner of the sensor (about one-fifth of the sensing surface area)

With reference to FIGS. 1, 2 and 3, the apparatus according to the present invention is shown to comprise a touch sensor consisting of a transparent or translucent substrate 10; a conductive film 20 (ITO layer) very thinly coated (or printed) on the upper surface of the substrate 10; an assembly of resistor elements 30 consisting of conductive material, printed in at least one layer and discontinuously along the four edges at the upper surface of the conductive film 20, wherein the adjacent ends of the individual resistor elements 30 are joined at junctions 61, 62, 63 and 64 at or near the corners, and wherein between each independent row of resistor elements 30 is a first gap 70; a plurality of discontinuous insulator elements 40 formed by removing (or etching) a part of the conductive film 20 near the inner side of the resistor element 30 on the surface thereof, the removed portions thus forming the plurality of insulator elements 40 which are arranged, in at least more than one row, on the inner side of the resistor elements 30; and a plurality of second gaps 50 formed between each row of the plurality of insulator elements 40.

The features of the method of the present invention comprise: connecting the conductive wires respectively onto the voltage junctions 61~64 at the four corners of the assembly of resistor elements 30; applying a positive electrode voltage to selected two of the junctions and applying OV voltage (or ground) to the other two of the junctions, utilizing the resistive area formed by the discontinuous resistor elements 30 located on the conductive film 20 layer and the first gaps 70 between adjacent resistor elements 30, to reduce the current flowing through each individual resistor element 30 so that a higher impedance value may be obtained on the surface of the conductive film 20, and to lower the field strength between the junctions of two corners, to thereby preliminarily minimize the degree of curvature of the equipotential lines; and utilizing the second gaps 50 located between the rows of the plurality of insulator elements 40 as resistive area, whereby the blockage of the insulator elements 40 causes the electrical field produced from the two ends of each resistor element 30 to flow toward the second gaps 50, to thereby further effectively rectify the curvature of the equipotential lines generated from the resistor elements 30 and first gaps 70, thus finally making the equipotential lines in the x direction and y direction of the electrical field on the conductive film 20 straight or linear.

According to the features of the method described above, the equipotential lines S in the x direction and the equipotential lines S1 in the y direction sensed on the conductive film 20 are all disposed to be straight lines, so that when the conductive film 20 is touched within its active area, a very accurate voltage signal in the x and y axial directions can be obtained.

According to the features of the apparatus described above, the substrate 10 preferably consists of glass material or flexible plastic material, the conductive film 20 preferably consists of indium tin oxide (ITO) material, and the resistor elements 30 preferably consist of silver pastes or frit.

According to the features of the apparatus and method described above, the middle row between the insulator elements 40 arranged on inner side and the resistor elements 30 arranged on the outer side is further provided with resistor elements 30' and insulator elements 40', wherein the insulator element 40' at each corner is preferably L-shape. The first and second gaps 50',70' formed thereby are used for compensating and correcting the electrical field effect in this area, so as to have the equipotential lines in the middle row of the resistor elements 30' and insulator elements 40' to be further corrected to generally straight lines, as shown in FIG. 3.

Figure 5:
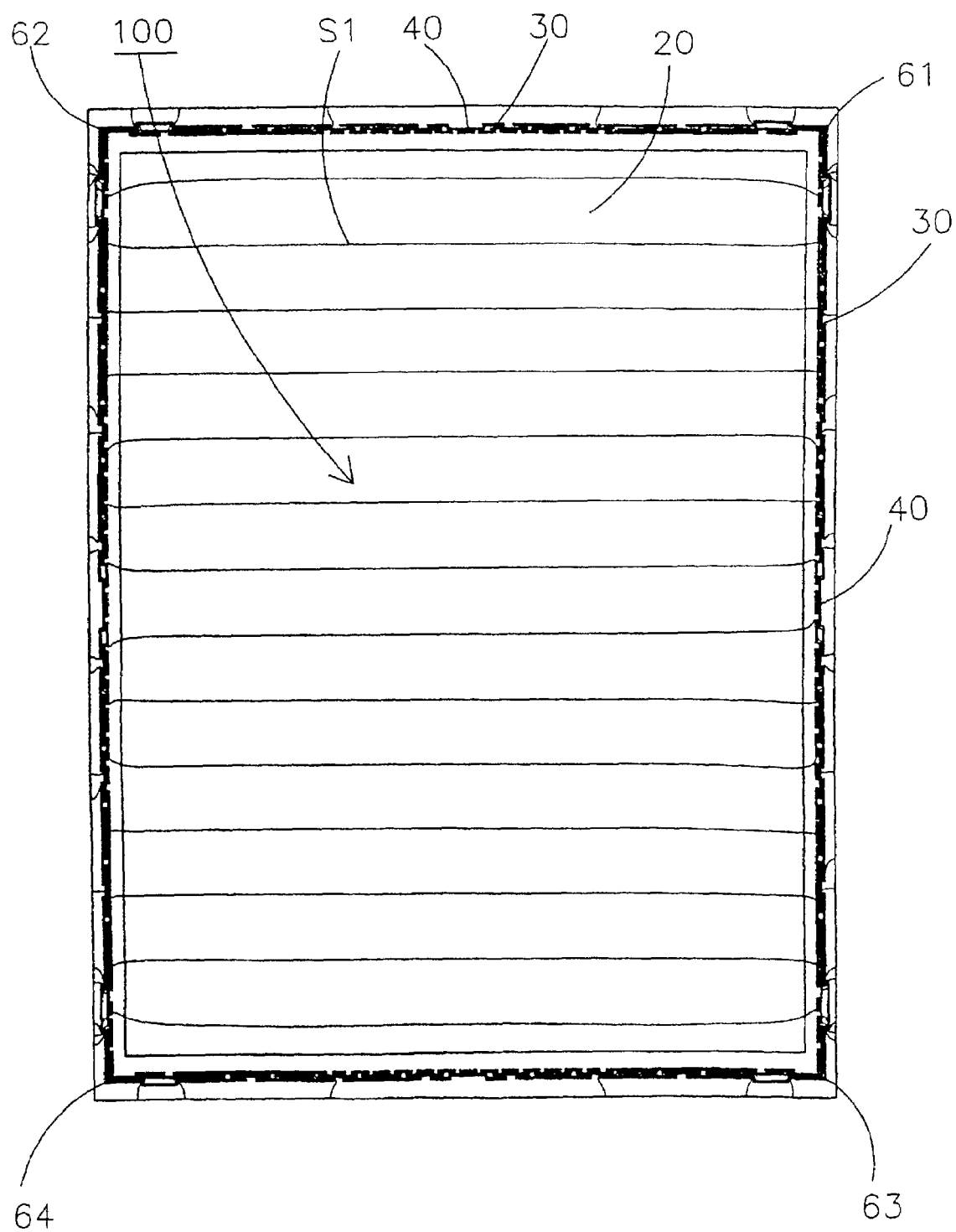
FIG. 5 is a plan view showing the touch sensor according to the present invention, showing the equipotential lines in the x-axis direction generated upon application of a voltage.
Figure 6:
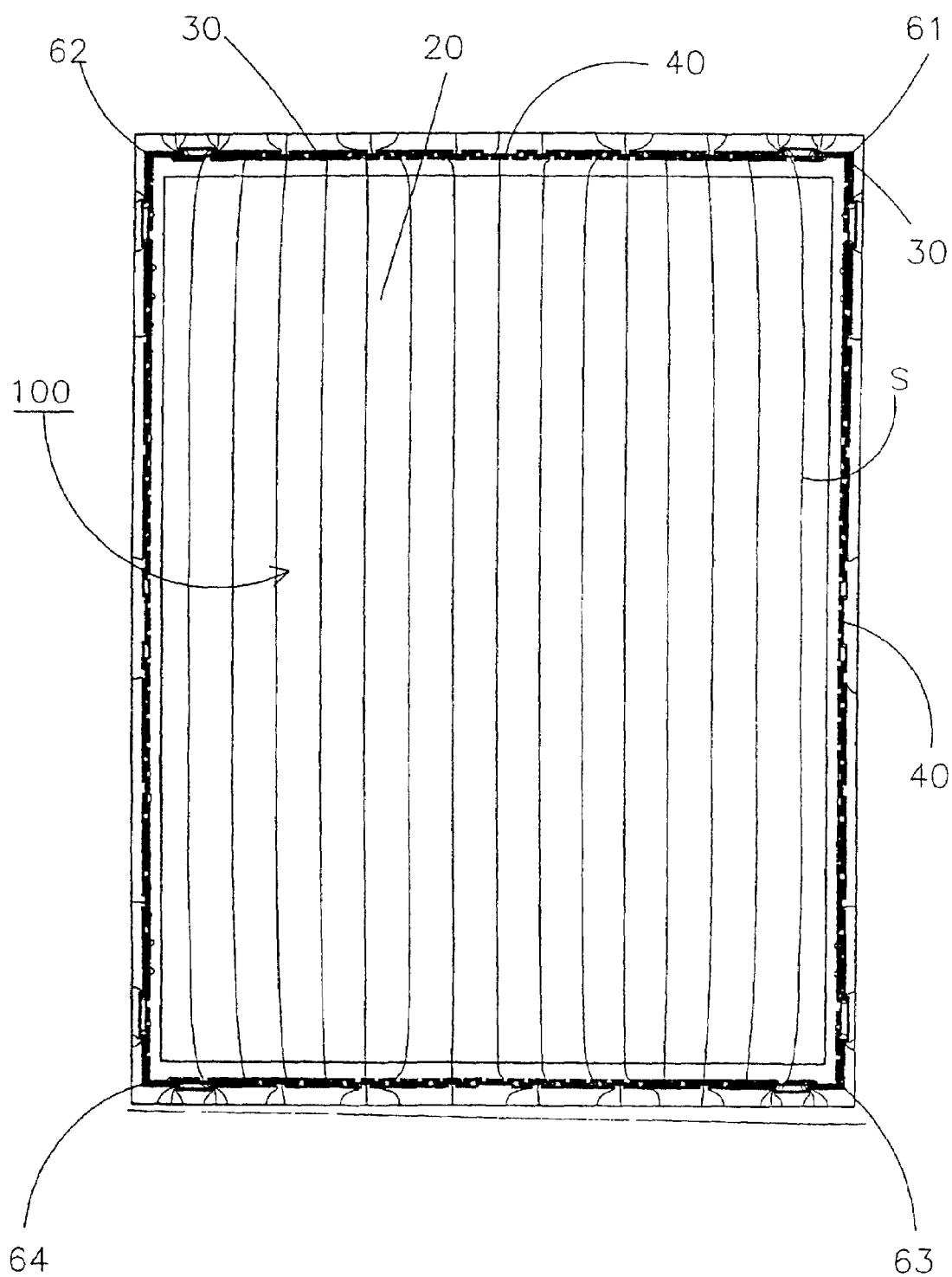
FIG. 6 is a plan view showing the touch sensor according to the present invention, showing the equipotential lines in the y-axis direction generated upon application of a voltage.
Figure 7:
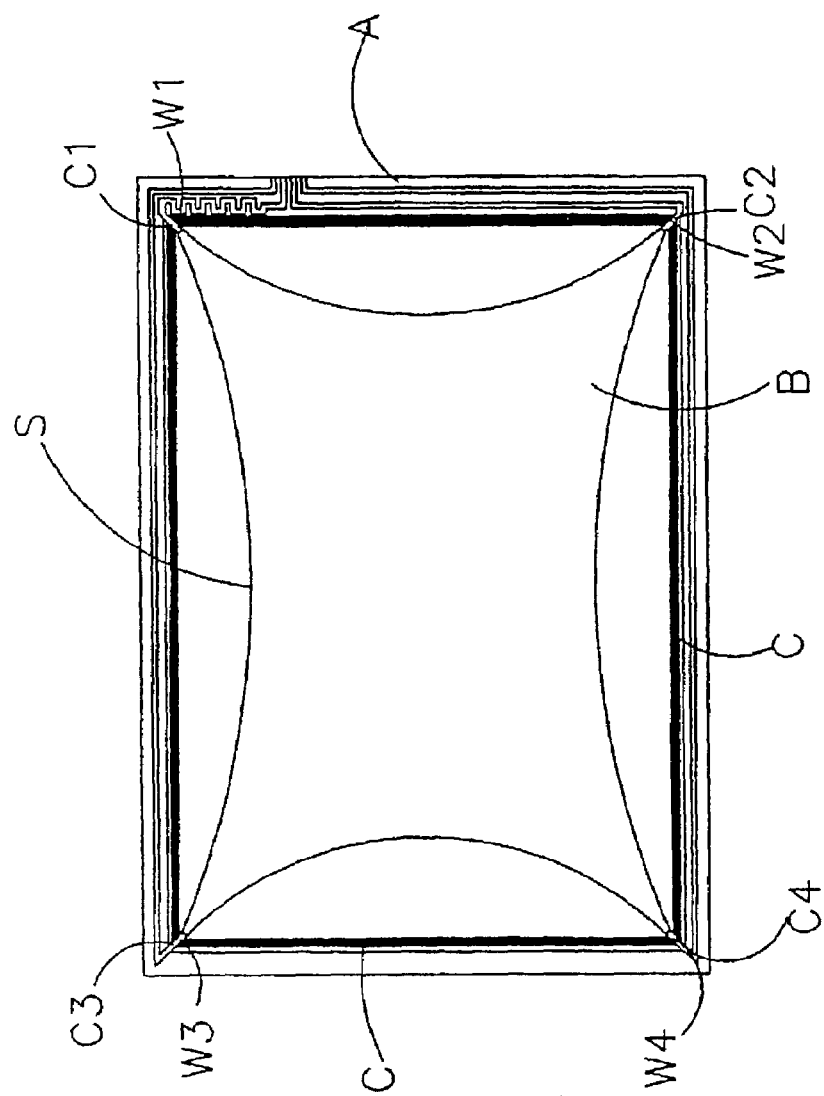
FIG. 7 is a plan view of a conventional touch sensor.

According to the features of the apparatus and method described above, in the region of the inner side-arranged insulator elements 40, the plurality of second gaps 50 further compensate and correct the electrical field generated in this region, and further correct the equipotential lines in these region to be disposed to straight lines, as best shown in FIGS. 5 and 6.

The present invention has the following embodiments in practice:

(1) With reference to FIG. 1, the substrate 10 may consists of a transparent or translucent rigid glass, or may be selected from flexible transparent or translucent plastic material. Firstly, a layer of conductive film 20 (ITO layer) is coated on the upper surface of the substrate 10 by coating or printing technique. A plurality of resistor elements 30 are printed in strips on the surface of the conductive film 20 at the four sides of the frame thereof. The resistor elements 30 are preferably of silver paste material or carbon-silver material, or other conductive material. The plurality of resistor elements 30 are printed and distributed, in one row or more and in a discontinuous configuration, on the surface of the conductive film 20 at the four peripheral sides thereof. The resistor elements 30 located at the junctions 61~64 positioned at the corners are of generally L shape. Each independent row of resistor elements 30 has first gaps 70 of different sizes. The gaps 70 consist of the same material as the conductive film 20 and, in terms of the field effect, is a resistive area. The main purpose of the plurality of gaps 70 is to lower the voltage difference generated at the two ends of each individual resistive element located between the two junctions 61,63, thereby increasing the impedance value on the area of the entire row of the resistor elements 30. As a result, the degree of curvature of the equipotential lines S generated by each row of resistor elements 30 is preliminarily minimized thereby. In other words, the voltage gradient generated by each two corner junctions can be effectively lowered by the discontinuity of, and the gaps 70 produced by, the resistor elements 30, such that the curvature of the initially produced equipotential lines S can be preliminarily improved. The length specifications and size of the resistor elements 30 and the gaps 70 therein are determined based on the size of the touch screen sensor (detector) and the applied working voltage value.

(2) As shown in FIG. 3, at least one to two rows or more of insulator elements 40 are formed by etching the portions near the inner side of the row of the resistor elements 30. Each adjacent row of insulator elements 40 is parallel to the other. Furthermore, some of the insulator elements 40 may be arranged in the same row with the resistor elements 30. Each individual insulator element 40 is devoid of the presence of the conductive film 20, and may be designed to have different lengths and sizes. A plurality of second gaps 50 of different sizes are formed in between the same row of and adjacent insulator elements 40. The gaps 50 are a part of the conductive membrane 20, and the object thereof is to form a resistive area for increasing the impedance value in the region between each row of the plurality of insulator elements 40, so as to further effectively balance the electrical field formed on the surface of each row of the plurality of resistor elements 30, and further to render the electrical field on the surface of the conductive membrane 20 uniform. The significance of this is that linear equipotential lines in the x direction or y axis direction on the active (reactive) area 100 of the conductive film 20 are obtained. The length (or number) specifications of the insulator elements 40 and the size of the gaps 50 are determined based on the size of the sensor and the working voltage value applied.

Figure 4:
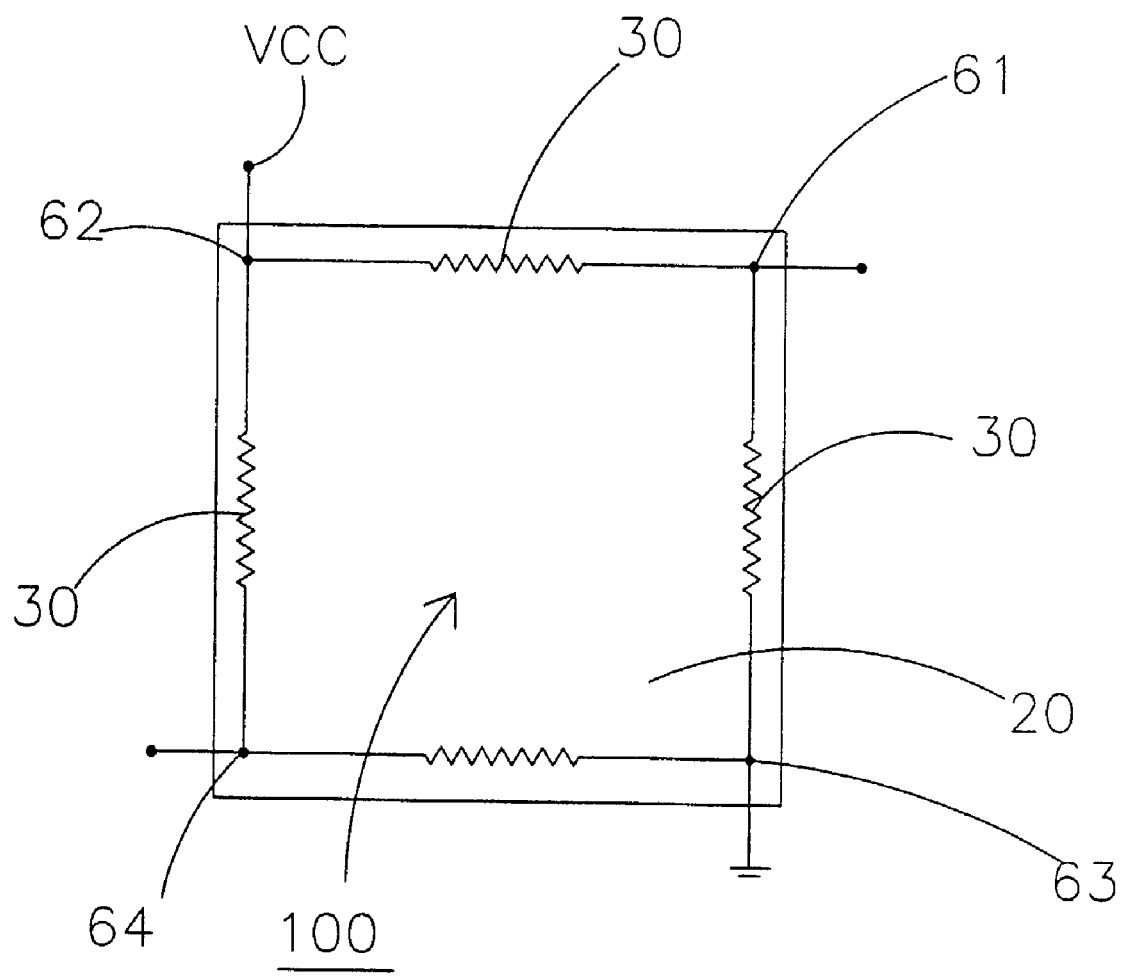
FIG. 4 shows the electrical circuitry diagram of the touch sensor according to the present invention.

(3) The gaps 70,50 in the present invention are formed by the spacing of each row of and adjacent resistor elements 30. The number and length of the gaps 70,50 depend on the size specifications of the sensor and the magnitude of the voltage applied on the sensor. Part of the current passing through the resistor elements 30 and intending to flow toward the surface of the conductive film 20 is confined to the area of the gaps 70 (i.e. the resistive area) of selected length, such that between each independent (single) resistor element 30 is formed a specific voltage gradient, thereby preliminarily balancing (making it uniform) the electrical field between any two of the junctions 61~64, so that the degree of curvature of the equipotential lines between any two of the junctions 61~64 (i.e., between each row of the plurality of resistor elements 30) can be preliminarily reduced. Between each row of insulator elements 40 and the outermost resistor elements 30 are further provided resistive elements 30' and insulator elements 40' which are arranged as the middle row. This middle row is formed by the straight-line arrangement of the assembly of resistor elements 30' and insulator elements 40' with each other, so that in this middle row are formed both the second gaps 50' and the first gaps 70'. The plurality of gaps 50',70' in the middle row similarly generate a certain specific voltage gradient, by means of which the bow of the equipotential lines is further minimized or eliminated. Between the insulator elements 40 on the inner side rows are formed a plurality of resistive areas (i.e., the gaps 50) which further compensate (offset) the bow of the equipotential lines, rendering the equipotential lines generated between two of the junctions 61~64, to be linear (straight), be it in the x axis direction or in the y axis direction. As shown in FIG. 4, the resistance symbol in each row therein represents the discontinuous resistor elements 30 of the sensor of the present invention. In this figure, the insulator elements 40 and gaps 50,70 are omitted. A positive potential VCC is applied on the junction 62, and the other junction 63 is grounded (i.e. 0 potential). When a positive voltage (+V) is applied on the junction 61 and 0 voltage (0V) is applied on the junction 64, straight vertical equipotential lines S in the y-axis are formed, as shown in FIG. 6. If a positive voltage (+V) is applied on the junction 64 via an external circuit conversion and 0V is applied on the junction 61, straight equipotential lines S1 in the x-axis are formed, as shown in FIG. 5. If these two states are continuously interchanged (switched), then when the active area 100 of the sensor is touched, voltage signals are generated for output on the uniform electrical field on the conductive film 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An apparatus for increasing the sensing accuracy of a touch sensor comprising:

a transparent or translucent substrate;

a conductive film very thinly coated on the upper surface of the substrate;

a plurality of resistor elements consisting of conductive material, each resistor element being in a linear shape parallel to an edge of said substrate printed in at least one or more than one row and in a discontinuous manner, on the upper surface of the conductive film at the perimeter thereof, wherein adjacent ends of individual resistor elements are joined at the junctions at or near the four corners by wires, and wherein first gaps are formed between each independent row of resistor elements;

a plurality of insulator elements, each insulator element being in linear shape parallel to an edge of said substrate discontinuously formed by removing a part of the conductive film near the inner side of the resistor elements on the surface thereof, the removed portions thus forming the insulator elements which are arranged in at least more than one row, on the inner side of the resistor elements; and a plurality of second gaps formed between each row of the plurality of insulator elements; wherein additional resistor elements and insulator elements are provided in a middle row between the inner arranged insulator elements and the outer-arranged resistor elements, the additional insulator elements located at the corners being preferably L-shape, and wherein additional first and second gaps are formed thereby for compensating and correcting the electrical field effect in this area, so as to further correct the equipotential lines in the middle row of additional resistor elements and insulator elements to generally straight lines.

2. An apparatus for increasing the sensing accuracy of a touch sensor as claimed in claim 1, wherein the substrate preferably consists of glass material or flexible plastic material, the conductive film preferably consists of indium tin oxide (ITO) material, and the resistor elements preferably consist of silver pastes or flit.

3. The apparatus of claim 1, wherein in the region of the inner side-arranged insulator elements, the plurality of second gaps further compensate and correct the electrical field generated in this region, and further correct the equipotential lines in these region to be disposed to straight lines.

4. A method for increasing the sensing accuracy of a touch sensor comprising the steps of: (1) connecting lead wires respectively onto the voltage junctions at the four corners of a plurality of resistor elements each resistor element being in a linear shape parallel to an edge of said substrate; (2) applying a positive electrode voltage to selected two of the junctions and applying OV voltage to the other two of the junctions; (3) utilizing the resistive area formed by the discontinuous resistor elements located on the conductive film layer and the first gaps between adjacent resistor elements to reduce the current flowing through each individual resistor element so that a higher impedance value may be obtained on the surface of the conductive film, and to lower the field strength between the junctions of two corners, to thereby preliminarily minimize the degree of curvature of the equipotential lines; and (4) utilizing the second gaps located between the rows of the plurality of insulator elements as resistive area, each insulator element being in linear shape parallel to an edge of said substrate whereby the blockage of the insulator elements causes the electrical field produced from the two ends of each resistor element to flow toward the second gaps, to thereby further effectively rectify the curvature of the equipotential lines generated from the resistor elements and first gaps, thus finally making the equipotential lines in the x direction and y direction of the electrical field on the conductive film straight or linear; wherein additional resistor elements and insulator elements are provided in a middle row between the inner arranged insulator elements and the outer-arranged resistor elements, the additional insulator elements located at the corners being preferably L-shape, and wherein additional first and second gaps are formed thereby for compensating and correcting the electrical field effect in this area, so as to further correct the equipotential lines in the middle row of additional resistor elements and insulator elements to generally straight lines.

5. A method for increasing the sensing accuracy of a touch sensor as claimed in claim 4, wherein the equipotential lines S in the x-axis direction and the equipotential lines S1 in the y-axis direction sensed on the conductive film are all disposed to be straight lines, so that when the conductive film is touched within its active area, a very accurate voltage signal in the x-axis and y-axis directions can be obtained.

6. The method of claim 4, wherein in the region of the inner side-arranged insulator elements, the plurality of second gaps further compensate and correct the electrical field generated in this region, and further correct the equipotential lines in these region to be disposed to straight lines.

* * * * *